(12) United States Patent
Bayne

(10) Patent No.: US 6,843,482 B1
(45) Date of Patent: Jan. 18, 2005

(54) SHAFT SEALS FOR SEALING PULVERULENT SOLIDS

(76) Inventor: Christopher Frederick Bayne, c/o Paulmen Seals Ltd, P O Box 21-550, Henderson, Auckland (NZ)

( * ) Notice: Subject to any disclaimer, the term of this patent is extended or adjusted under 35 U.S.C. 154(b) by 0 days.

(21) Appl. No.: 10/030,998

(22) PCT Filed: Jul. 12, 2000

(86) PCT No.: PCT/NZ00/00123
§ 371 (c)(1),
(2), (4) Date: Jan. 15, 2002

(87) PCT Pub. No.: WO01/06154
PCT Pub. Date: Jan. 25, 2001

(30) Foreign Application Priority Data

Jul. 15, 1999 (NZ) ................................................ 336765

(51) Int. Cl.[7] ............................................. F16J 15/447
(52) U.S. Cl. ...................... 277/412; 277/415; 277/419
(58) Field of Search .................................. 277/303, 411, 277/412, 415, 418–420

(56) References Cited

U.S. PATENT DOCUMENTS

| 1,508,555 A | | 9/1924 | Hults | |
|---|---|---|---|---|
| 3,841,643 A | * | 10/1974 | McLean | ...................... 277/420 |
| 4,154,447 A | * | 5/1979 | Francis et al. | ............... 277/420 |
| 4,353,559 A | * | 10/1982 | Budzich et al. | .............. 277/416 |
| 4,402,515 A | * | 9/1983 | Malott | ......................... 277/415 |
| 4,426,088 A | * | 1/1984 | Ernst | ........................... 277/427 |
| 4,659,349 A | * | 4/1987 | Rodi et al. | .................. 55/385.4 |
| 4,842,423 A | * | 6/1989 | Bhagwat | ...................... 277/361 |
| 5,533,737 A | * | 7/1996 | Borowski | ..................... 277/419 |
| 5,676,472 A | * | 10/1997 | Solomon et al. | ............. 384/607 |
| 6,073,777 A | * | 6/2000 | Jansen | .......................... 210/460 |
| 6,205,913 B1 | * | 3/2001 | Zittel et al. | ................... 99/348 |

FOREIGN PATENT DOCUMENTS

| DE | 2505554 A1 | * | 8/1975 |
| EP | 0 629 800 | | 12/1994 |

* cited by examiner

Primary Examiner—Alison K. Pickard
(74) Attorney, Agent, or Firm—Young & Thompson

(57) ABSTRACT

An apparatus and method for providing a seal between first and second relatively rotatable parts of machines which operate in an environment comprising dust, grit or other finely divided solid material entrained in air, water or other fluid. The seal includes a rotor and a stator between which there is an annular passage with substantial clearance between the interfacing surfaces defining the passage. The solid material entrained in the fluid which enters the annular passage is deposited in layers on the interfacing surfaces when the mechanism is in use. The layers substantially reduced the cross sectional size of the annular passage and restrict flow of the fluid there through. The annular passage may be rendered tortuous by providing the rotor with annular fins which in use project into annular recesses in the stator, and vice versa.

10 Claims, 9 Drawing Sheets

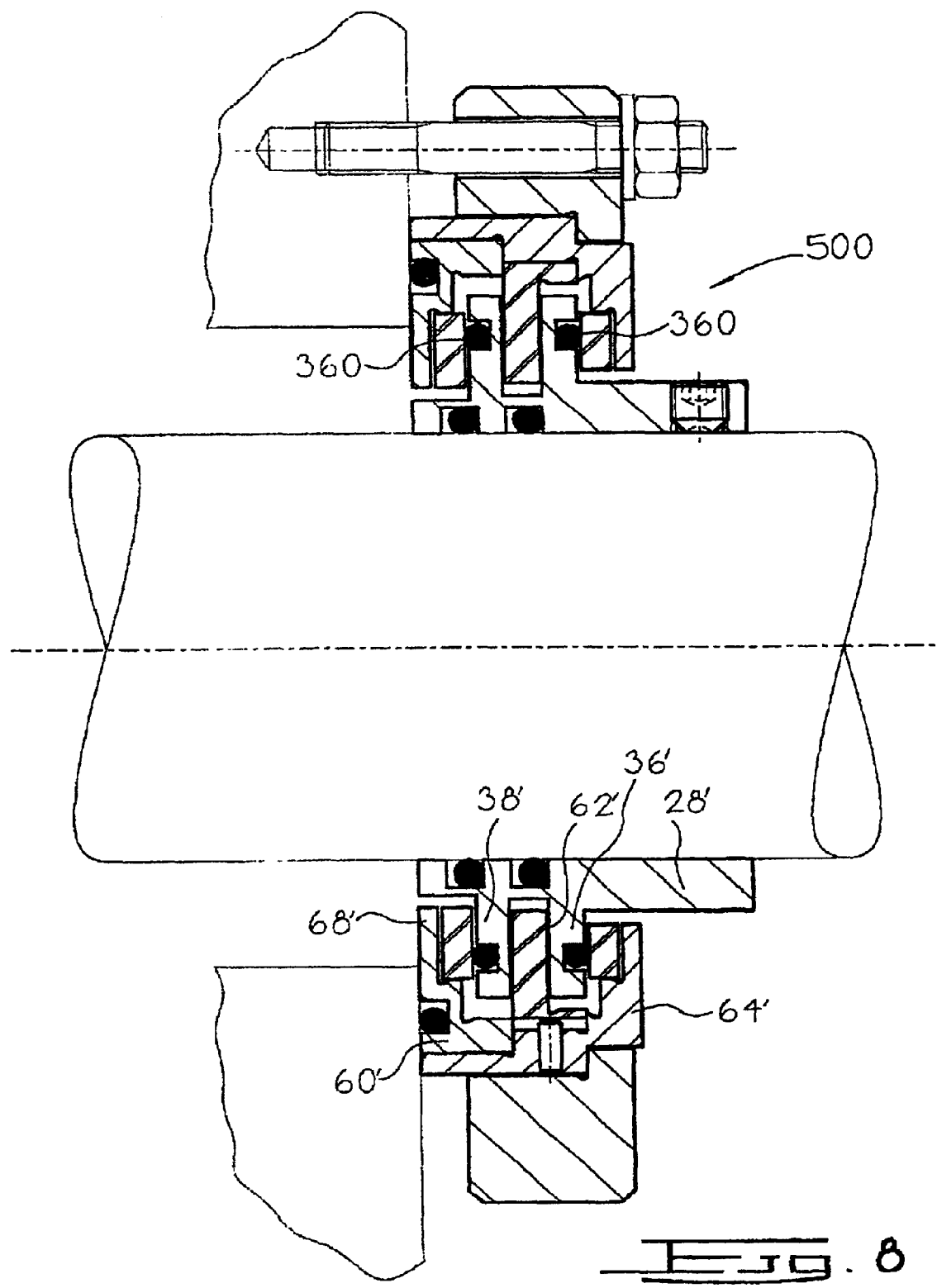

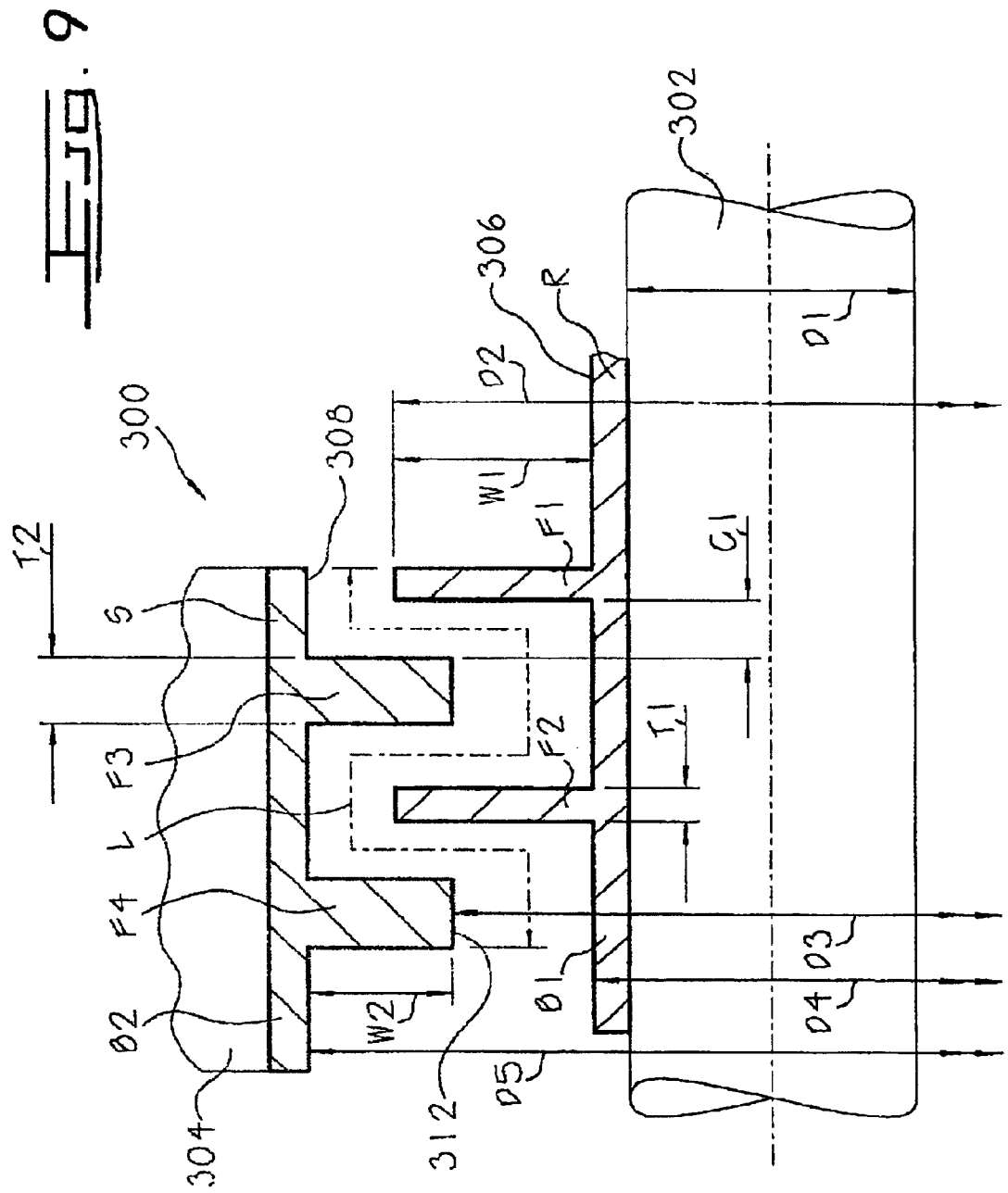

SHAFT SEALS FOR SEALING PULVERULENT SOLIDS

FIELD OF THE INVENTION

There are countless applications in industry in which a mechanism is called for which comprises a rotatable member (such as a shaft) which passes through or is seated or supported in or adjacent an aperture in some stationary part of the mechanism (such as a wall or bearing housing).

BACKGROUND OF THE INVENTION

The present invention is particularly but not necessarily exclusively concerned with equipment in which such mechanisms operate in an environment in which finely divided solids are present, the solids being carried either in a fluid such as air (or other gas) or water (or other liquid). Such equipment includes screw conveyors, bucket elevators, ribbon mixers, so-called Z mixers, rotary valves, augers, pulverizers, hammer mills, powder transfer equipment and other mixing equipment. This list is not intended to be exhaustive and the invention could in principle be applied to any suitable equipment which operates in conditions in which it is desirable that gas or liquid borne solid material should be excluded from bearings or other components of the equipment, or should, for any other reasons, including environmental, health or safety reasons, be contained within a vessel or other enclosed space. Any such item of equipment is included in the term "applicable equipment" when it is used herein.

In the case of equipment comprising a rotatable member/aperture combination as described above, seals are used to prevent liquid, gas or solid matter (or a mixture thereof) from passing into or through the aperture. Most seals comprise a part (called a rotor) which is fixed on the rotatable member. Similarly, most seals comprise a part (called a stator) which is fixed on the stationary part of the mechanism.

Such seals must inescapably comprise an interface at which the rotor contacts or comes close to the stator and careful attention must be paid to the design of the components at the interface. Any leakage of the fluid medium in which the seal is working which takes place past the seal is most likely to occur at the interface. Also, a primary cause of failure of a seal is due to abrasive matter which is entrained in the fluid medium which penetrates between the stator and the rotor at the interface or the build up of heat due to rubbing contact between the stator and the rotor at the interface.

The present invention relates to so called labyrinth seals. This term is used loosely in the art but, for the purposes of this specification, a seal is one in which, by design, there is no intentional contact between the rotor and the stator at the interface. Rather, the parts of the rotor and stator are shaped so that there is a passage (or 'labyrinth') extending along the interface, the physical characteristics and the operating conditions therein being such as to effect the desired sealing action.

In conventional labyrinth seals which are designed for use with liquid media the passage is commonly so narrow that, by design, only a film of the liquid is present in the passage. This film is adherent to the surfaces of the stator and the rotor along the interface and it is the film which, in principle, prevents the liquid medium from passing through the passage when the seal is in use.

In conventional labyrinth seals which are designed for use with gaseous working media, the passage is commonly even narrower than the passage in a seal for liquids. The parts of the seal (including the parts of the stator and the rotor which form the passage at the interface) are arranged to bring about a pressure gradient between the ends of the passage which is sufficient to prevent the working medium from passing through the passage when the seal is in use.

Various means have been used to increase the effectiveness of labyrinth seals. For example, most seals for liquid working media have some means for removing any liquid which penetrates more than a certain distance into the passage. Many seals (commonly called dynamic seals), for both liquid and gaseous working media, have some means for raising the pressure in the passage (for example by pumping the liquid or gas into or through the passage) to a level which is higher than the ambient pressure of the medium in which the seal is working. The stators of yet other seals are provided with packings, brushes or the like which do in fact make contact the rotors in use. Packings are often used to prevent abrasive material carried in the working medium from penetrating to the interface. So-called brush seals are commonly used in turbine engines.

The conventional labyrinth seals of which the applicant is aware are intended for use in mechanisms where the shaft or other rotating member on which the rotor is mounted rotates at relatively high speed. In fact, in many cases, it is essential that such seals be operated at high speeds if they are to function property. By contrast, the shafts of applicable equipment generally operate at relatively low rotational speeds. For this reason, and also due to the fine clearance between the parts of the stators and the rotors of conventional labyrinth seals, the latter would be unsuitable to be used in applications where there is a substantial amount of abrasive material such as grit or dust in the working medium. There are however many industrial applications which call for such seals and it is well known that the seals which are conventionally used in such applications are not very satisfactory.

It is one object of the invention to provide a labyrinth seal which might find use in at least some applications in which the working medium is a dust producing pulverulent solid or a gas or liquid in which a substantial amount of finely divided solid material is suspended.

SUMMARY OF THE INVENTION

According to the invention, apparatus for providing a seal between first and second relatively rotatable parts of a mechanism used in an environment comprising pulverulent material entrained in a fluid, the apparatus comprising a first element and a second element between which an annular passage is defined when the first element is mounted on one said part of the mechanism and the second element is mounted on the other said part of the mechanism and the one part is rotated with respect to the other, the annular passage being defined by interfacing surfaces of the respective elements between which there is clearance and on which, when the mechanism is in use, pulverulent material entrained in the fluid which enters the annular passage can be deposited in layers which substantially restrict flow of the fluid through the annular passage.

According to another aspect of the invention, in a mechanism which operates in an environment comprising a fluid borne pulverulent solid and which comprises a first part which rotates relative to a second part, a method of providing a seal between the first and second parts of the mechanism includes the steps of providing a seal assembly comprising a first element and a second element between which an annular passage is defined when the first element is mounted on one said part of the mechanism and the second element is mounted on the other said part of the mechanism and the one part is rotated with respect to the other, the annular passage being defined by interfacing surfaces of the respective elements between which there is clearance and on which, when the mechanism is in use, pulverulent material entrained in the fluid which enters the annular passage is deposited in layers which substantially restrict flow of the fluid through the annular passage.

In one form of the invention, the fluid is a gas. In an alternative form of the invention the fluid is a liquid.

The effectiveness of the seal is determined in part by the width of the passage defined by the space between the layers of solid material. This passage constitutes a labyrinth. The operating conditions in the equipment and the layout of the passage should thus be conducive to allowing the layers to be formed and to be stable once they are formed. The applicant has found that, provided the layout and dimensions of the passage are such as to limit the rate of flow of the fluid through the annular passage before the layers begin to be formed sufficiently to ensure that solid material is deposited on the interfacing surfaces by such fluid, the layers are substantially stable once they have been formed. The rate of flow in turn is determined largely by the length of the annular passage and, because the clearance between the interfacing surfaces in the annular passage is, as will be explained, large compared to conventional labyrinth seals, the length of the passage of a seal falling within the ambit of the invention will usually be relatively great.

It has been found that there is a rough correlation between the dimensions of the components along the interface and the diameter of the shaft on which the seal assembly is mounted. In such seal assemblies the minimum diameter of the annular passage is often nearly equal to the diameter of the shaft. For the sake of precision, the minimum diameter of the passage will be used in defining the parameters of the invention.

According to one aspect of the invention, the ratio of the minimum value of the clearance between the interfacing surfaces to the minimum diameter of the passage is not substantially less than 1:150.

According to another aspect of the invention, the minimum value of the ratio of the length of the annular passage to the minimum diameter of the annular passage is not substantially less than 1:2.

Providing that the passage is tortuous also helps to achieve the desired low rate of flow of fluid through the annular passage.

Another means of ensuring that the solid material is deposited on the interfacing surfaces is by providing that the width of the interfacing surfaces is relatively large compared to conventional labyrinth seals. According to another aspect of the invention, therefore, the ratio of the width of the interfacing surfaces to the smallest diameter of the annular passage is not substantially less than 1:20.

In any seal assemblies suitable for use with applicable equipment having a shaft diameter of 20 mm or more, manufacturing and operational factors are likely to determine that the minimum value of the clearance between the interfacing surfaces is not substantially less than 0.4 mm.

According to one aspect of the invention, the apparatus comprises a first member which is located in the annular passage and which is constructed of material which is more susceptible to wear than the material of which the interfacing surfaces of the elements are constructed, there being clearance between the first member and the interfacing surfaces so that the first member is able to move both radially and axially in the annular passage.

According to yet another aspect of the invention, the apparatus is provided with second and third members which are located in the annular passage and which are constructed of material which is more susceptible to wear than the material of which the interfacing surfaces of the elements are constructed, the second member being seated on the stator and the third member being seated on the rotor so as to rotate therewith with respect to the second member, there being clearance between the second member and the third member so that the third member is able to move radially with respect to the second member when the rotor rotates.

Although the interfacing surfaces may in principle be disposed at any angle to the rotational axis of the rotor, manufacturing considerations are likely to be the determining factor in selecting the angle of disposition and in most cases the interfacing surfaces will be substantially perpendicular or parallel to the rotational axis.

There are many other factors which have an influence on the stability of the layers. These factors include the nature of the fluid and the solid material and the particle size and the moisture content of the latter; the operating conditions of the equipment such as the size and rotational speed of the shaft and the pressure of the fluid. The applicant's experience however suggests that once a seal has been found to work satisfactorily in a given application (especially in the materials handling applications suggested above) the same seal is likely to perform satisfactorily despite quite wide variations in these other factors.

The solid material could, for example, include dry powders, dust granules, sand, grit ore and crushed rock. As is well known, all of these produce substantial quantities of grit and air borne dust when they are being handled or treated in large quantities in industrial applications. Similar examples of solid material also occur in water or slurries of other liquids.

BRIEF DESCRIPTION OF THE DRAWINGS

The invention is further discussed with reference to the accompanying drawings in which:

FIGS. 4 to 8 are cross sectional side views each of a seal assembly according to the invention mounted on a rotatable shaft; and FIG. 9 is an entirely diagrammatic cross sectional side view of an "ideal" seal assembly intended to help clarify the meaning of some of the terminology used in this specification and the claims.

DETAILED DESCRIPTION OF EMBODIMENTS OF THE INVENTION

For the sake of avoiding repetition, in this specification the use of the phrase "in the present example" or words to the same effect is intended to indicate that what is being described is by way of illustrative example and that there is no intention that the scope of the invention be limited thereto unless this appears from the context. On the other hand, there is no intention that in the absence of a phrase of the same kind, the scope of the invention is to be limited by any matter described unless this appears from the context.

Figure 1:
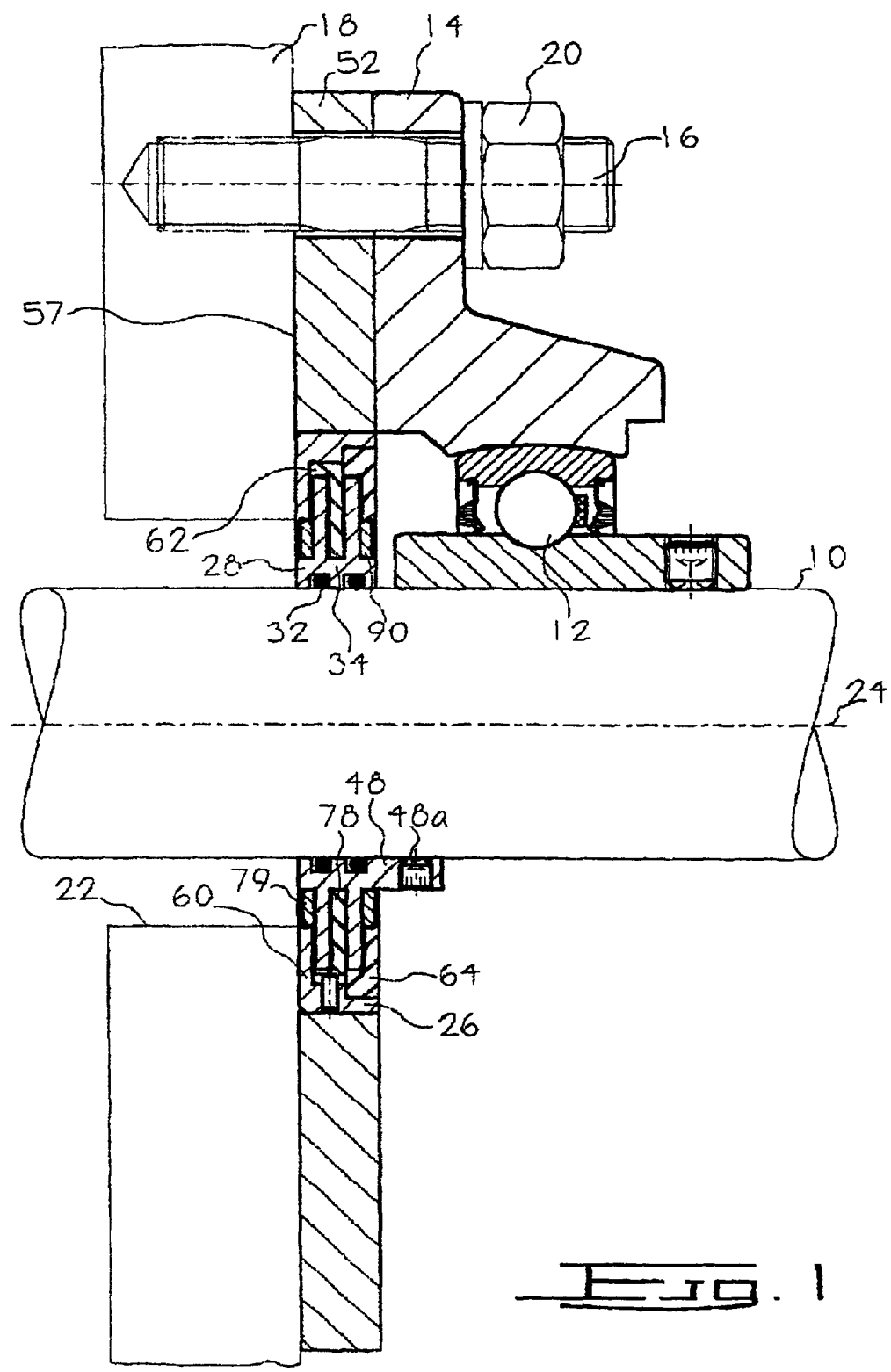
FIG. 1 is a cross sectional side view of one example of a first seal assembly mounted on a rotatable shaft in front of a flange mount bearing.
Figure 2:
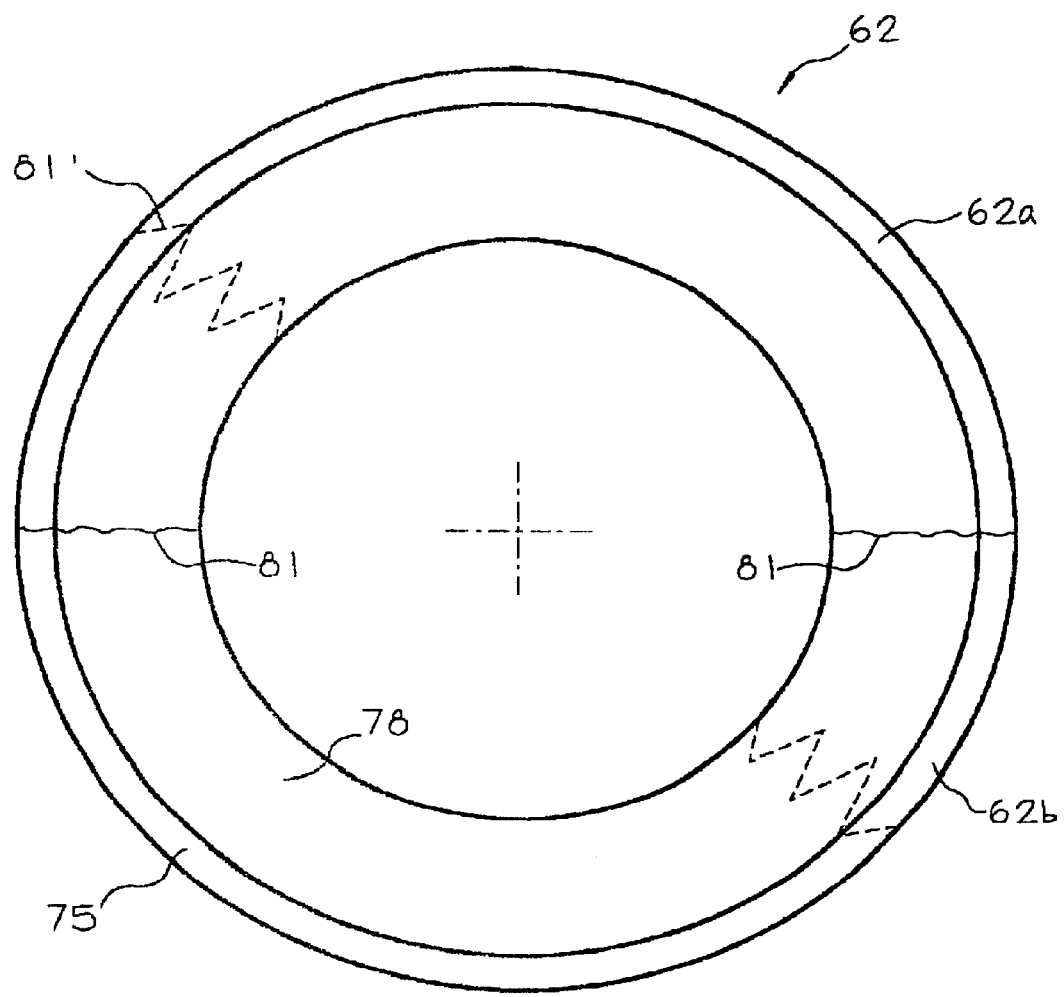
FIG. 2 is an end view of a split ring or stage ring being one of the components of the seal assembly shown in FIG. 1.
Figure 3:
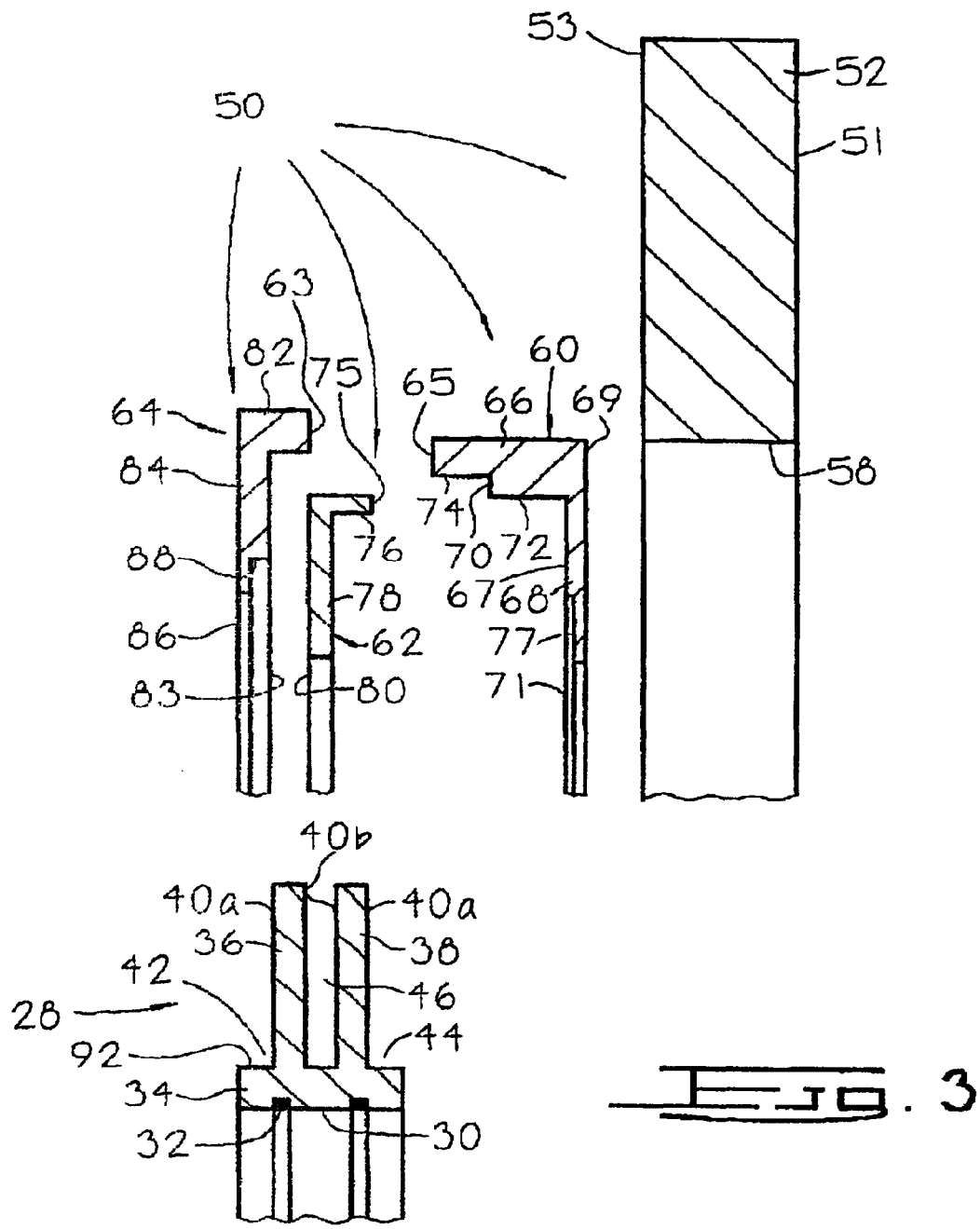
FIG. 3 is an enlarged cross sectional side view, showing parts of the first seal assembly separated from each other.

Referring first to FIGS. 1 to 3, there is shown a shaft 10 carried in a ball bearing assembly 12 seated in a housing 14. The ball bearing assembly 12 and the housing 14 can be a commercially available "off the shelf" unit and need not be described in detail. The housing 14 is mounted over four threaded machine bolts or studs 16 fixed on a plate 18 and held in place by means of nuts and washers 20.

In the present case the plate 18 is the vertically disposed end wall of a vessel constituting the casing of a screw conveyor. The shaft 10 carries a helical flight arrangement by means of which material which is fed into one end of the vessel is transported therethrough. Screw conveyors are typically required to handle comminuted solid materials which are either in dry form or mixed with water or other liquid to form slurry. The shaft 10 is arranged to be driven by (for example) an electric motor through a reduction gear box coupled through a conventional coupling to the shaft. Only a portion of the shaft 10 of the screw conveyor is shown since, apart from the sealing arrangement described below, it is of conventional design.

It should be understood that the plate 18 and the other components shown in the drawing could equally well be parts of any other applicable equipment. Furthermore, the plate 18 might be disposed at any angle between horizontal and vertical.

As shown in the drawing, the shaft projects through an aperture 22 in the plate 18 with the rotational axis 24 perpendicular to the plate 18, the interior of the vessel being to left of the plate 18. Whether the material being handled by the equipment is wet or dry, it is necessary to protect the bearing from abrasive matter entrained in such material and a seal assembly 26 is provided for this purpose.

The seal assembly comprises a rotor 28 (see FIG. 3) fixed on the shaft 10. The rotor may be machined from a work piece of stainless steel or any other suitable material. The rotor is annular, having an axis which is concentric with the rotational axis 24 of the shaft. The rotor has a bore 30 through which the shaft 10 projects. Two conventional O-ring seals 32 are located in channels formed in the face of the bore 30. The O-rings 32 prevent leakage of the medium handled by the screw conveyor past the interface between the bore 30 and the shaft 10.

The rotor comprises a hub 34 with two mutually identical fins 36, 38 formed integrally with the hub. Each fin 36, 38 has opposed, highly polished radial faces 40a, 40b which, in the present example, are parallel to each other and perpendicular to the axis 24. The fins 36, 38 are spaced from each end of the hub 34 and, with the outer face of the hub, define annular recesses 42, 44 located adjacent the respective ends of the hub. The fins are also spaced from each other so that, with the outer face of the hub, they define an annular channel 46 located between the fins.

The seal assembly further comprises a stator assembly 50. The stator assembly includes a retaining plate 52 and a number of annular rings 60, 62, 64. In use the retaining plate is clamped between the bearing housing 14 and the machined outer face 57 of the plate 18 by means of the nuts 20.

A cylindrical bore 58 is machined in the retaining plate. The rings 60, 62, 64 are inserted in the bore. The ring 60 is generally L-shaped in cross section, comprising an axially extending skirt 66 and a flange 68 which extends radially inwardly from one end of the skirt 66. The skirt is a press fit in the bore 58 and the flange is located in use in the annular recess 44 of the rotor with the outer face 69 of the flange 68 flush with the right hand outer face 51 of the retaining plate 52. The overall width of the ring 60 is substantially equal to the thickness of the retaining plate 52 so that when the flange 68 is located against the face 57 of the wall 18, the free end 65 of the skirt 66 is substantially flush with the left hand outer face 53 of the retaining plate 52. The bore of the skirt 66 is divided into two portions 72, 74 by a step 70. The diameter of the bore portion 72 is smaller than that of the bore portion 74. A recess 77 is formed in the inner face of the flange 68. This recess accommodates an annular setting ring 79, the function of which is discussed further below.

The stage ring 62 is also L-shaped, having a skirt 76 and a flange 78 which extends radially inwardly from one end of the skirt 76. The skirt 76 is a press fit in the bore portion 72 of the ring 60. The overall width of the ring along the skirt 76 is substantially equal to that of the bore portion 72 so that, when the stage ring 62 is in place, the outer face 80 of the flange 78 is flush with the step 70.

When the seal is assembled the flange 78 of the stage ring 62 is accommodated in the annular channel 46 of the rotor 28. The method of assembly of the seal assembly 26 is discussed below but it is convenient to mention here that, in order to be able to assemble the seal, the stage ring 62 is 'split'. That is, the ring is divided in the present example into two semi-annular segments 62a, 62b which are separated at the radially extending interfaces 81 located substantially on a diameter of the stage ring 62.

The ring 64 is also L-shaped in cross section, having an axially extending skirt 82 and a flange 84 which extends radially inwardly from the outer end of skirt 82. The skirt 82 is a press fit in the bore portion 74 of the ring 60 and the width of the skirt 82 is substantially equal to that of the bore portion 74 so that, when the ring 60 is in place, the outer face 86 of the flange 84 is flush with the annular end face 65 of the skirt 66. A recess 88 is formed in the inner face of the flange 84. This recess accommodates a second annular setting ring 90 which is similar to the setting ring 79.

When the seal has been assembled the flange 68 is located in the recess 44. The thickness of the flange 68 is such that there is clearance between the inner radial face 71 of the flange 68 and the outer face 40a of the rotor fin 38. Similarly, the thickness of the flange 84 is such that, when it is located in the recess 42, there is clearance between the inner radial face of the flange 84 and the outer face 40a of the rotor fin 36. Furthermore, the thickness of the flange 78 is such that, when it is located in the channel 46, there is clearance between each of the radial faces of the flange 78 and the inner faces 40b of the respective fins 36, 38. There is also clearance between the inner ends of the flanges 68, 78, 84 and the interfacing parts of the outer face 92 of the rotor hub 34.

The faces of the rings between which there is the aforementioned clearance constitute a composite interface between the rotor and the stator. Because of the clearance, there is, by design, no contact between the rotor and the stator so that, along the interface, there is an annular passage extending from one side of the seal to the other. After the seal is assembled and before it is put into use, the clearance is substantially greater than the clearance along the interface between the rotors and stators of conventional labyrinth seals. The clearance must be large enough to allow dust or other finely divided solid material which is suspended in the air or other fluid contained in the vessel of the screw conveyor to migrate into the passage where it is deposited on those interfacing portions of the rotor and stator which define the passage. After the seal has been in use for some time the deposited material builds up in layers. The thickness of these layers increases to the point where the effective width of the passage is reduced to a substantial extent. Eventually the layers come into contact with each other as the rotor rotates, limiting further build up of the layers. At this point the passage is property 'labyrinthine' in that it is so small in width that, effectively, none of the fluid can pass therethrough.

For the finely divided solids to be able to enter the passage and start to build up the layers, the initial width of the passage (i.e. the clearance between the rotor and the stator along the interface before the seal is put into use) must be at least double the size of the finest particles of solid material which will occur in significant quantity in the fluid. In most circumstances however, the clearance will be substantially greater than this minimum without appreciably affecting the building up of the layers or the operation of the seal. In many cases, particularly, where the particle size is small, the clearance will be substantially greater than twice the particle size owing to practical problems encountered in constructing and operating such seals. It is necessary for example that the design of the components make allowance for relative radial and axial movement of the components at the interface. Such relative movement occurs as the rotor rotates but can also occur, for example due to thermal expansion, vibration and misalignment of the components. There is in particular a practical and economic limit as to how flat the radial faces of the components can be made. The less flat such radial faces are the greater will need to be the clearance therebetween. Furthermore, it is common for the shaft on which a seal rotor is mounted to run out of true and this fact requires that both the axial and radial clearance between the components of a seat at the interfaces be increased. The clearance must not however be so great that the solids are unable to build up into stable layers or that such layers are liable to be damaged by large particles carried into the passage by the fluid medium. Either of these problems are exacerbated if the fluid medium is able to flow through the passage at appreciable speed. This might cause "tracking", a tendency for entrained solids to flow along a preferential path in the passage, thereby disrupting the uniformity of the layers. A clearance which is too great could also have the further unacceptable result that particles entrained in the fluid might get to the bearing or escape from the vessel to the surrounding environment before the layers start to form. The optimum clearance at an interface between the components of a seal assembly of the invention can be established by testing.

In the example illustrated, the seal assembly is used in a screw conveyor handling aluminium oxide the minimum particle size of the dust of which is about $15\mu$. The clearance between the interfacing components of the seal in the axial direction is 0.5 mm and in the radial direction is 4.5 mm. By way of further illustration, seal assemblies similar to those shown in the drawings have been mounted on shafts of between 20 mm and 600 mm diameter, rotating at speeds up to 1500 rpm, installed in all types of the applicable equipment mentioned above. The minimum particle size of dry powders handled by this equipment has ranged between $1\mu$ and $200\mu$. (In this specification $\mu$=micron). Similarly, the minimum size of solid particles suspended in slurries handled by this equipment has ranged between $1\mu$ and $300\mu$. For all this equipment, clearances between the components at an interface has ranged between 0.4–6.0 mm in the axial direction and 0.5–12 mm in the radial direction. Where the material is suspended in a slurry or is clamp, the seals remain effective although in some cases they have been used in conjunction with a mechanical seal as discussed below. The optimum size of all the working parameters may be established in each case by experiment.

The overall length of the passage has an appreciable effect on the rate at which the fluid is able to flow through the passage. In the present case the length of the passage is effectively equal to the sum of the width of each of the two radial faces 40a, 40b of each of the fins 36, 38 and the overall thickness of the hub 34. In the example illustrated this length is about 71.4 mm and the minimum diameter of the rotor at the interface is 56.5 mm. In principle, there is no upper limit to the length of the passage and the upper limit will probably be determined by cost and operational considerations. The optimum length can be established by testing in any particular case. In practice the length of the passage is unlikely to be less than 50% of the minimum diameter of the rotor at the interface at least in screw conveyors and other applicable materials handling equipment having a shaft size between 20 mm and 600 mm as described.

In common with many conventional seals, the faces of the components shown in FIGS. 1–3 which make up the interface are disposed either at 90° or parallel to the rotational axis of the shaft. However, seals constructed according to the invention have two or more sets or stages of such faces which are substantially wider, relative to the shaft diameter than in the case of conventional seals.

In the seals which have been installed in equipment with shaft diameters ranging between 20 mm and 600 mm as described, the width of such faces has ranged between about 5% and 30% of the minimum diameter of the passage. In the example illustrated in FIG. 1, the width of the radially extending faces 40a, 40b or the rotor (which make up the major part of the interface) is close to 14 mm which is 24% of the minimum passage diameter. In seals for use with applicable equipment for handling dry powder in general, the width of such faces, whatever their angular disposition relative to the rotational axis of the shaft, is unlikely to be less than about 10% of the shaft diameter. In similar equipment for handling slurries, this proportion can be lower but is unlikely to be less than 5% of the minimum diameter of the passage.

Where a seal assembly of the kind shown in FIGS. 1 to 3 is to be installed in heavy duty equipment, it may be provided with two or more stage rings similar to the stage ring 62 whose flanges are received between additional rotor fins similar to the fins 36, 38.

In most applicable equipment, there is no significant such pressure differential across the seal. Where such differential exists, it should not exceed about 1 bar. Where a significant pressure differential is likely to occur, a conventional mechanical seal may be installed downstream of a labyrinth seal constructed according to the invention. The latter will substantially prevent solid particles in the fluid medium from penetrating to the mechanical seal.

The rotational speed of the rotor has little significant effect on the operation of the seal, at least at the relatively slow rotational speeds (5–1500 rpm) of the shafts of most applicable equipment. In the example in FIG. 1, the shaft typically rotates at about 700 rpm.

Referring again to FIGS. 1–3, the function of the setting rings 79, 90 is primarily to ensure that the correct clearance is maintained between the faces of the components when they are being assembled. The width of the setting rings is therefore selected so that after assembly, the clearance between the face of each setting ring and the opposing face of the respective fin 36, 38 is about of the clearance between the opposing faces of the rings 60, 64 and the fins 38, 36. The setting rings are sacrificial: i.e. it is expected that they will deteriorate rapidly after the seal is put into service and they play little or no part in the operation of the seal after such deterioration occurs. However, as discussed below, analogously to the function of the lip seal 150 provided in the assembly 100 illustrated in FIG. 4, the setting rings 79, 90 may have some limited effect in contributing to the build up layers of solid material on the interfacing faces immediately after a seal is put into use.

The components of the seal assembly 26 (as of the assemblies shown in the other drawings) may be made of the same materials which are used for the similar components of conventional seals. Thus the rotor and the rings 60, 64 may be made of an abrasion resistant material, preferably of metal. For many applications the material may also need to be corrosion resistant and/or capable of taking and retaining a high polish in which case the material may be, for example, bronze, stainless steel or a ceramic material. The stage ring 62 and the setting ring 79, 90 may be of Teflon or other suitable self-lubricating synthetic plastics material which is softer than the rotor so that it will wear preferentially.

An advantage of using a material such as Teflon or oil filled nylon for the stage ring 62 is that the two segments 62a, 62b may be derived from a single ring which is machined to shape and split along a diameter by the so called 'random cracking' or 'random cutting' method. This involves scoring the ring on a diameter and giving the ring sharp taps at the score lines. Alternatively, a knife may be placed on the ring at a diameter and given a sharp tap. In these circumstances the ring will break apart into the two segments along the score lines. The interfaces between the two segments at the breaks will be jagged which helps to lock the two segments together in the correct relative position when they are reassembled.

If the stage ring is made of metal, a useful method of splitting the single ring is by means of so-called wire cutting or spark erosion. An advantage of this method is that the cut which is made in the material in the splitting operation is very fine so that the splitting operation can be carried out after the original single ring is finish machined. The two segments 62a, 62b formed from the original ring are both usable. Another advantage of this method is that the pattern of the cut can also be jagged as indicated at 81' which, again, helps to lock the two segments together in use.

The stage ring may also of course be formed by other conventional methods such as by finish machining two ring halves placed together after the ring has been partially machined.

The setting rings may also be of alternative materials known to be suitable for the purpose including hardened and fibre reinforced resin or carbon filled nylon.

One advantage of the seal assembly 26 is that the retaining plate 52 may be made of a relatively inexpensive material such as cast iron or aluminium. In conventional seals, the part of the stator in which a stage ring is inserted is formed as a unitary body made of bronze, stainless steel or the like. This adds to the cost of conventional seals.

The seal assembly 26 is sold as an 'off the shelf' unit with the components assembled together in the following manner. The ring 60 is first pressed home into the bore 58 of the retaining plate 52. The setting ring 79 is inserted in the recess 77 of the flange 68. The two segments 62a, 62b of the stage ring 62 are inserted in the channel 46 of the rotor 28 and the stage ring 62 (together with the rotor 28) is then pressed home into the bore portion 72 of the ring 60. The setting ring helps to prevent misalignment of the stage ring 62 in the ring 60. At this stage, the outer face 80 of the flange 78 is flush with the step 70. The setting ring 90 is inserted in the recess 88 of the ring 86 which is then pressed home into the bore portion 74 of the ring 60. Again, the setting ring 90 helps to prevent misalignment of the ring 64 in the ring 60. At this stage the outer face 86 of the flange 78 is flush with both the left hand end 65 of the skirt 66 and the face 53 of the retaining plate.

To mount the seal assembly, any coupling flange, pulley, bearing or the like, already mounted on the portion of the shaft which protrudes out of the vessel through the aperture 22 must first have been removed. The rotor 28 is mounted over the free end of the protruding portion of the shaft 10 and pushed along until the retaining plate comes into contact with the wall 18 of the vessel. The bearing 14 is then mounted in the same way and fixed in place by tightening the nuts 20 with the seal assembly sandwiched between the bearing and the wall 18.

An advantage of the seal assembly 26 is that it is slim enough to be used in conjunction with the bearings of many existing installations which were previously not provided with separate seals. The additional space required by the assembly 26 is only the width of the retaining plate which in most cases need not be more than about 12 mm for a shaft of any reasonable size found in applicable equipment.

Another advantage of the seal assembly 26 is that the stage ring 62 is held in place by the ring 60 and it is thus not necessary to provide other means for holding the segments together.

The rotor 28 may be provided with a lug 48 which accepts a set screw 48a for locking the rotor on the shaft.

Figure 4:
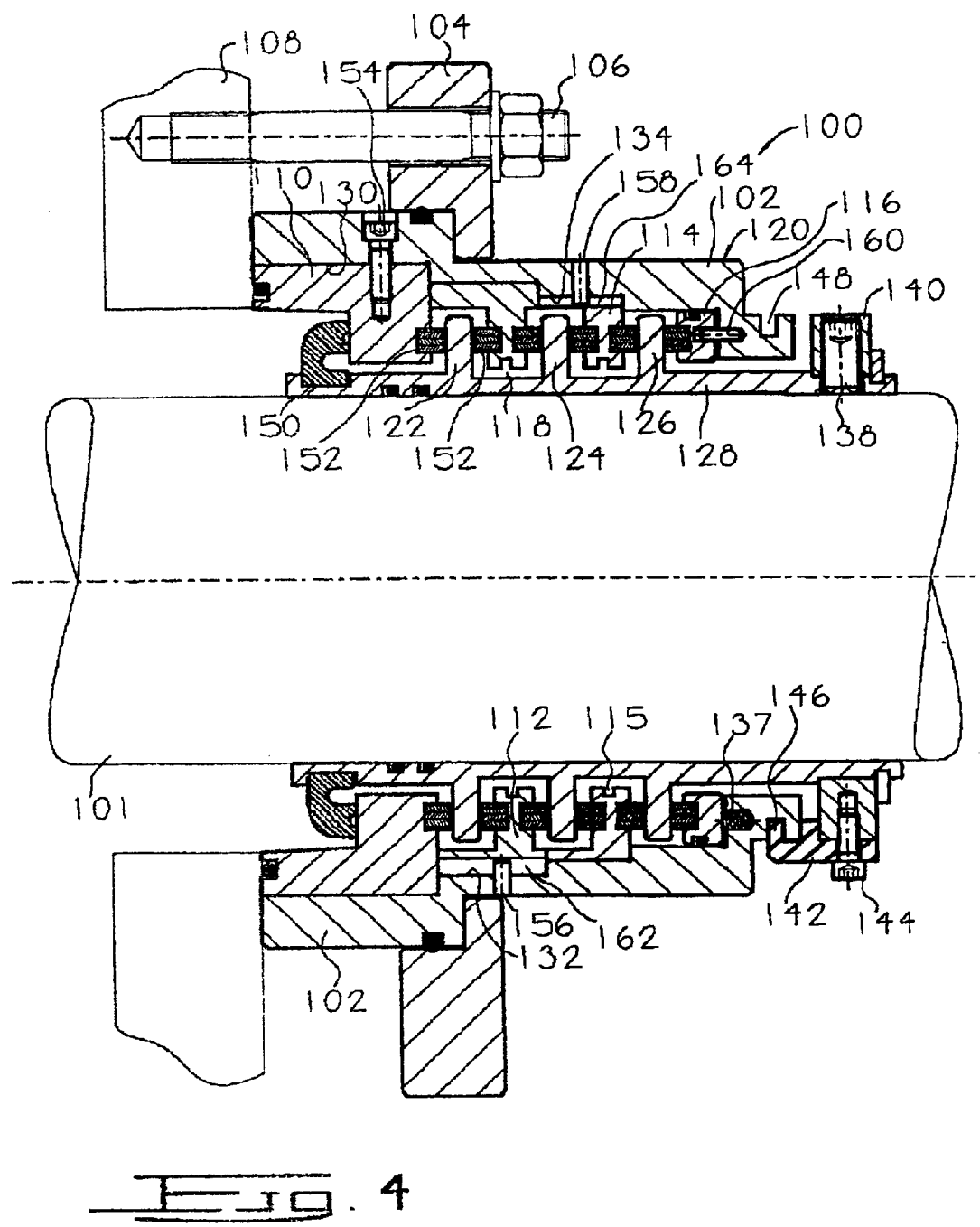

In FIG. 4 a second example of a dry seal assembly 100 is illustrated which is suitable for operation at the relatively slow rotational speeds of the shafts found in applicable equipment. In FIG. 4, the seal assembly, mounted on a shaft 101 of 125 mm diameter, Is drawn substantially to scale. It is not considered necessary to describe the assembly or its components in detail. However, the assembly includes a stator 120 comprising a housing 102 fixed by a holding ring 104 and studs 106 to the wall 108 of a vessel. In a conventional seal, the rotor would be housed in a housing which, because of the fine clearances between the interfacing parts of the rotor and the stator, would be of relatively expensive material such as stainless steel, the holding ring 104 can be of less expensive material such as mild steel.

Four sealing rings 110, 112, 114, 116 are withdrawably inserted in the housing and have flanges which coact with fins 122, 124, 126 formed in the rotor 128 to define a labyrinthine passage 118 between the rotor and the stator. The rings may also be of stainless steel or any other suitable material. The two inner rings 112, 114 are split along a diameter to enable their flanges to be inserted in the two inner annular channels defined by the fins 122, 124, 126 of the rotor 128. The respective rings 110–114 are seated in seats 130–136 formed in the housing. The rings and the respective seats in which they are located are of progressively diminishing diameter.

The seats have shoulders to locate the rings in the axial direction. Through springs 137, the ring 116 is urged in the axial direction towards the fin 126. The rotor is locked on the shaft 101 by grub screws 138 mounted in a ring 140. A split locating ring 142 is fixed to the ring 140 by means of set screws 144 and, through a lip 146 received in an annular recess 148 in the stator, serves to locate the rotor 128 axially with respect to the stator 120. The function of the spring loaded ring 116 is to reduce the velocity of the powder which enters the passage from the vessel, thus preventing jetting and allowing build up of the layers of powder in the passage. The locating ring 142 is removed after installation of the seal has been completed.

An axial face lip seal 150 is mounted on the rotor 128 at its inner axial end and bears on the inner radial face of the flange of the innermost ring 110 of the stator. The lip seal 150 is of rubber or other suitable material. The purpose of the lip seal is to provide a seal immediately after the assembly 100 is put into use. There is a large clearance (typically about 5 mm) defining a passage 118 between the opposing radial faces of the flanges and the fins. Having regard to this clearance, the air or other medium contained in the vessel may, in the absence of the lip seal, have a tendency to escape through the passage at a velocity which prevents or slows down the build up on the faces of the flanges and fins of dust or other material which, once formed, reduces the effective width of the passage and forms the seal. The lip seal initially reduces the velocity of the medium through the passage. The solid material entrained in the medium is in most cases abrasive and soon causes the lip seal to become ineffective as a seal. However, the life of the lip seal is sufficient to allow the build up of layers of the material in the passage which effectively reduce the cross sectional size of the passage and take over the sealing action.

Setting pads 152 of, for example, a conventional fibre impregnated resinous material, seated in grooves in the flanges of the rings 110–116, are located between the opposing faces of the flanges and the fins in the passage 118. The pads are sacrificial and serve initially to increase the pressure drop of, and turbulence in, the gaseous medium in the passage 118. They also locate the rings 110–116 accurately with respect to the interfacing parts of the rotor when the seal is being assembled.

Annular recesses 115 are formed in the inner axial faces of the rings 112, 114. These recesses also make the passage more tortuous and increases turbulence therein. The presence of the setting pads and the recesses each promotes the build up of the layers of solid material on the faces of the passage.

Screws 154 and anti-rotation pins 156–160 are inserted between the housing 102 and the respective rings 110–116 to preventing the rings from rotating with the rotor. In the case of the inner rings 112, 114 the respective anti-rotation pins 156, 158 are received in axially extending slots 162, 164.

Figure 5:
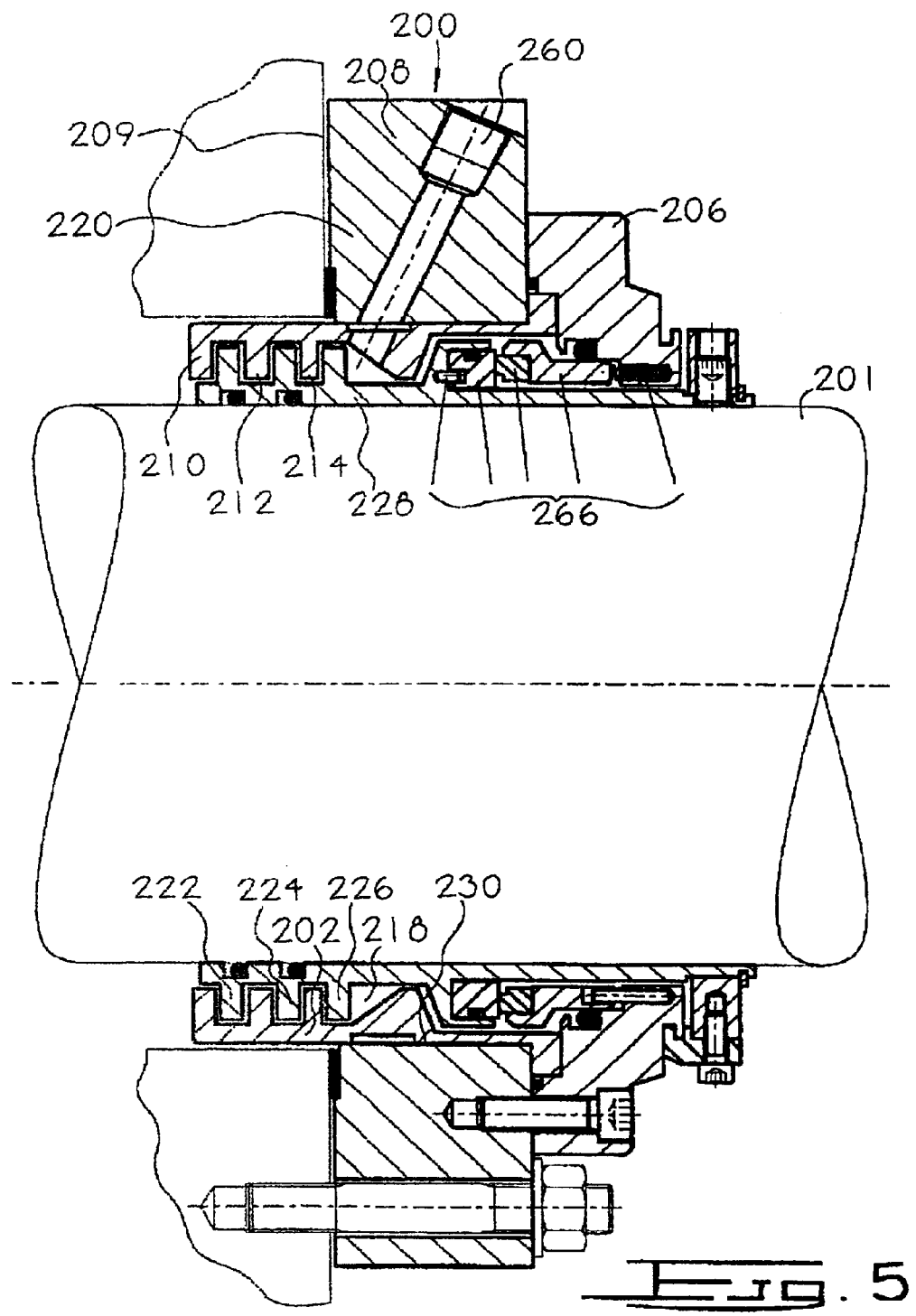

In FIG. 5 a third example of a seal assembly 200 is illustrated. It is drawn to scale and is mounted on a shaft 201, typically of 180 mm diameter. This assembly 200 is suitable for sealing the rotating shaft of equipment which handles slurry, through a wide range of rotational speeds. Again, in this case also it is not considered necessary to describe the assembly or its components in detail. However, it may be noted that the stator 220 comprises a split ring component 202 seated in a seat 230 machined in a holding ring 208 clamped to the wall 209 of a vessel such as a pump housing by a clamping ring 206 of inexpensive material. The rotor 228 comprises three annular fins 222, 224, 226 which intermesh with three flanges 210, 212, 214 machined integrally in the split ring component 202 to define a labyrinth passage 218.

A port 260 is formed in the holding ring 208. An oil or water connection is mounted in the outer end of the port and by this means oil or water can be introduced into the passage 218.

At its outer end the component 202 is machined to receive a mechanical seal assembly 266 of conventional design and construction. In the present case the oil or water in the port 260, which is at a higher pressure than the slurry in the pump housing, prevents the slurry from passing through the passage 218 and gaining access to the mechanical seal assembly 266. After the whole seal assembly has been in operation for some time, any solid material carried in the slurry which finds its way into the passage is deposited on the faces of the components defining the passage 218, substantially decreasing the effective width thereof and forming a seal of it's own accord. The solid material initially entrained in the little liquid medium which penetrates to the mechanical seal is substantially removed in the labyrinth passage.

An assembly constructed substantially in the manner shown in FIG. 5 may also be used to seal dry materials. In this case grease or oil may be pumped into the labyrinth passage if it is compatible with the dry material being handled. For example, if the dry material is sugar or another foodstuff, a food grade grease may be used. Alternatively, air at a small positive pressure may be pumped into the passage.

In both of the assemblies 100, 200 the labyrinth passages extend as much axially (i.e. parallel to the axis of rotation of the shafts) as radially.

The dimensions of one example of the seal shown in FIG. 5 are given in Table A. The ratio R1 of the widths of the radial interfacing surfaces of the fins 210–214 and 222–226 to the smallest diameter of the passage between the interfacing surfaces of this seal is close to 1:20 or 5%. The ratio R2 of the length of the passage 218 to the smallest diameter of the passage between the interfacing surfaces of this seal is close to 1:1.84, or 54%. These ratios are small compared to the same dimensions in the corresponding components of the other seal assemblies shown in the drawings. This is because it is harder for a liquid medium to penetrate the passage between the interfacing surfaces than a gas medium. In fact the ratios are close to the minimum for seals which are within the ambit of the invention. Similarly constructed seals having corresponding ratios R1, R2 of as little as 5% and 50% respectively would still be effective for some applications.

Figure 6:
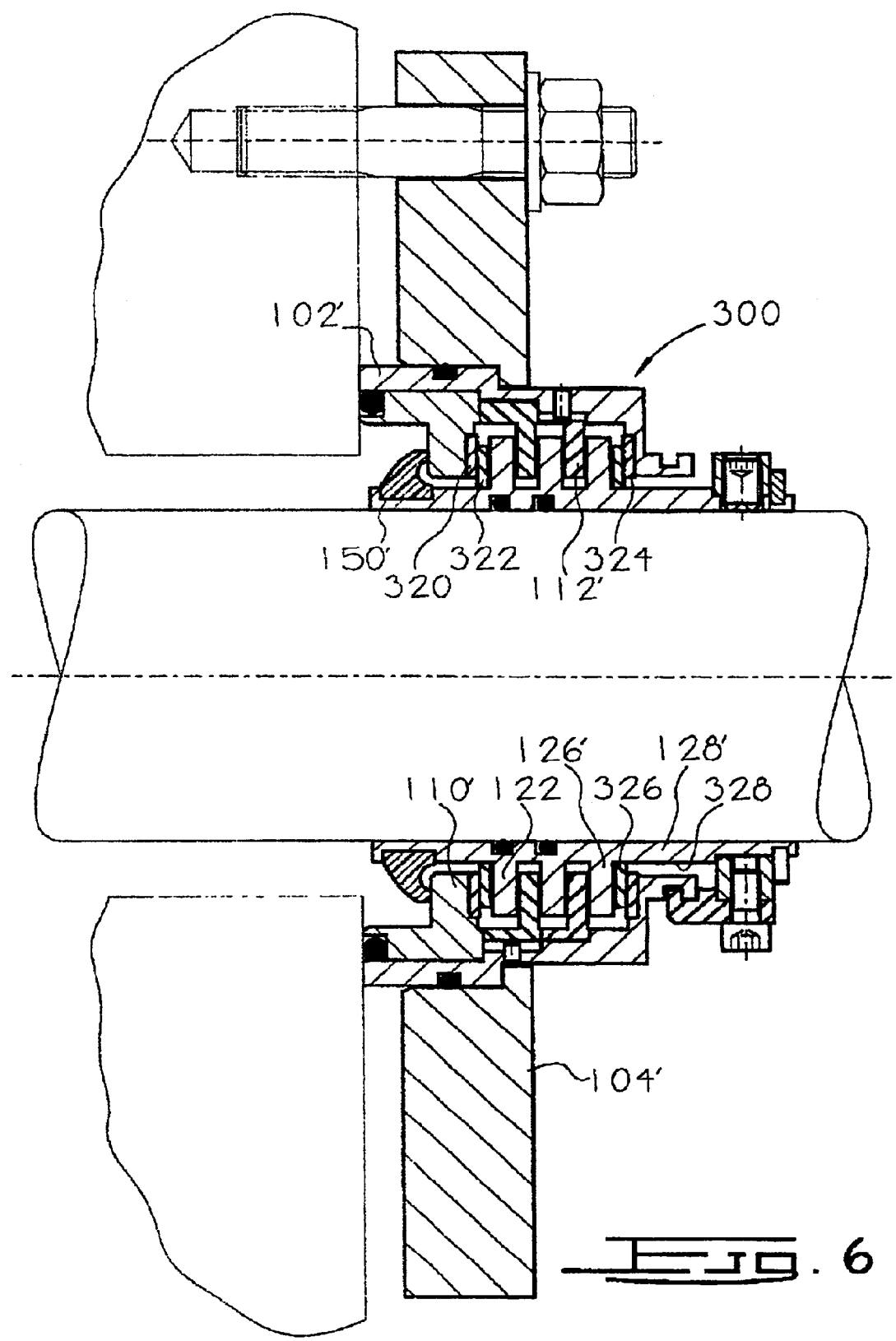
Figure 7:
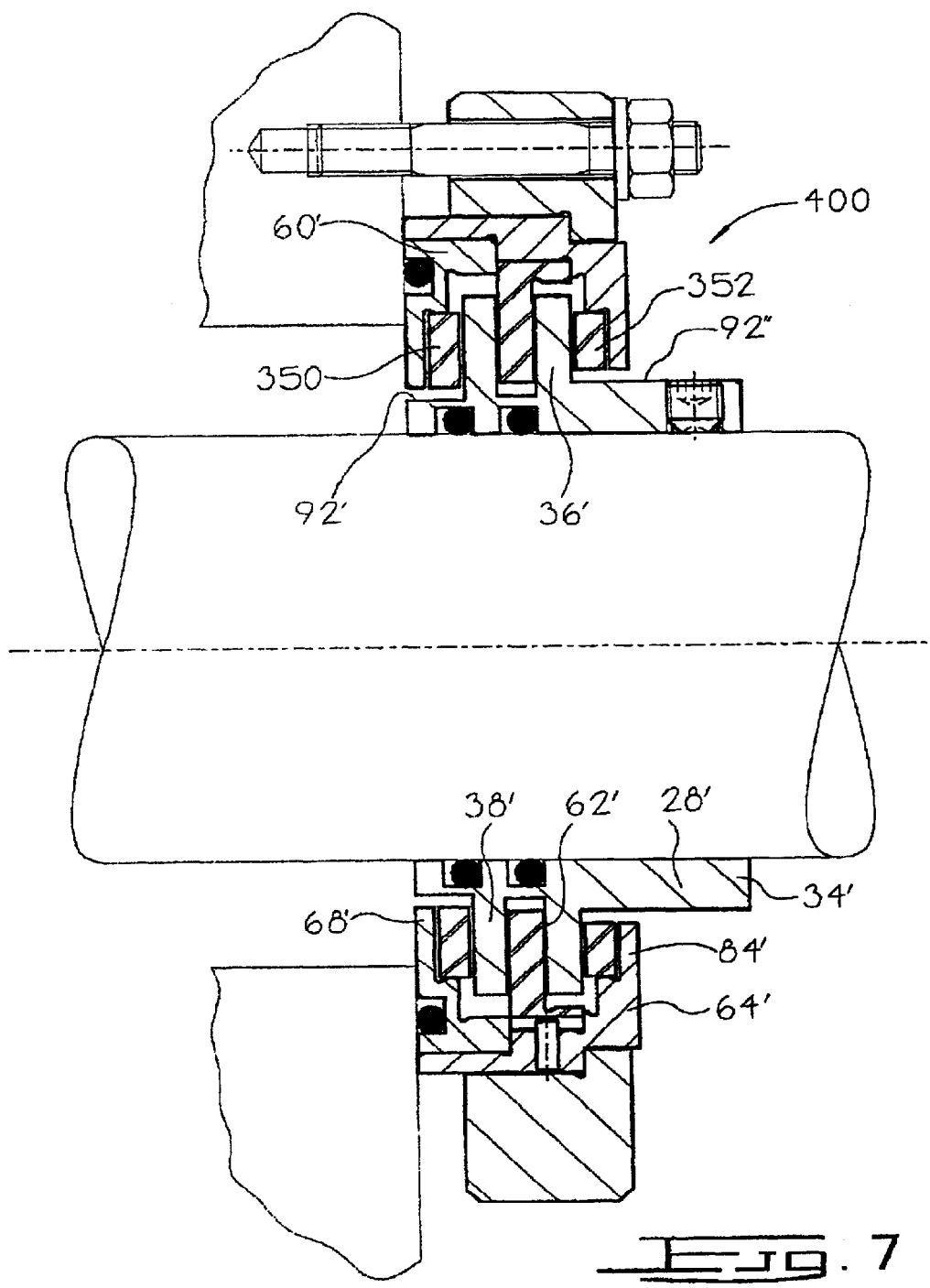

Further examples of seal assemblies according to the invention are illustrated in FIGS. 6 to 8, which are also drawn to scale. In FIG. 6, the components of the seal assembly 300 which are identified by dashed reference numbers have counterparts which are identified by the same numbers shown undashed in the assembly 100 shown in FIG. 4. Similarly, the components of the seal assemblies 400, 500 shown in FIGS. 7 and 8 respectively which are identified by dashed reference numbers have counterparts which are identified by the same numbers shown undashed in FIG. 1. The nature and function of these components are similar and it is not necessary to describe them in detail.

Referring to FIG. 6, a first pair 320, 322 of what will be called "slipper plates" are mounted between the flange of the sealing ring 110' of the stator and the fin 122' of the rotor. Similarly, a second pair 324, 326 of slipper plates are mounted between the flange of the stator housing 102' and the fin 126'. The plates 320, 324 are snugly seated in annular seats in the respective flanges. The plates 322, 326 are snugly seated on the outer cylindrical face 328 of the rotor and against the radial faces of the respective fins 122', 126'. The slipper plates are of oil filled nylon or any other suitable material. Their function is somewhat analogous to that of the setting pads 152 in FIG. 4 in that they are sacrificial and serve initially to increase the pressure drop of, and turbulence in, the gaseous medium in the passage between the stator and the rotor. Initially there is, by design, clearance between the slipper plates. In the example illustrated, this clearance is equal to 0.4 mm. In use the slipper plates soon wear away and the sealing function is taken over by the layers of solid material which build up on the interfacing surfaces of the rotor and the stator in the passage. However, the use of radially split ring shaped plates for this purpose eliminates any contact of moving parts of the plates with components of the stator and the rotor. Furthermore, they function efficiently even when there is considerable radial movement between the rotor and the stator when the shaft is turning.

Referring to FIG. 7, the assembly 400 has a setting ring 350 located between the flange 68' of the ring 60' of the stator and the rotor fin 38'. Similarly there is a second setting ring 352 between the flange 84' of the stator ring 64' and the rotor fin 36'. The outer faces of these setting rings are located in annular recesses machined in the inner radial faces of the respective flanges 68', 84'. The inner faces of the setting rings are located adjacent the outer faces 92', 92" of the rotor hub 34' and the outer radial faces of the respective fins 38', 36'. The setting rings are of Teflon material. They are sacrificial and their function is similar to that of the setting rings 79, 90 of the assembly shown in FIG. 1. However, the dimensions of the setting rings 350, 352 are such that, by design, initially there is clearance all round between each setting ring and the adjacent parts of the rotor and the stator. In larger seal assemblies, this clearance is typically 3 mm all round. Thus, each setting ring 350, 352 is initially able to move by as much as 6 mm both radially and axially when the shaft is turning. As happens in the assembly 100, the setting rings soon wear away and the sealing function is taken over by the layers of solid material which build up on the interfacing surfaces of the rotor and the stator in the passage.

The seal assembly 500 shown in FIG. 8 is similar to the assembly 400. However, annular recesses are machined in the outer radial faces of the fins 38', 36'. These recesses accommodate O ring seals 360 which bear on the inner radial faces of the respective setting rings 350, 352. The function of the O rings is somewhat analogous to that of slipper plates in that they are able to slip radially over the setting rings. They decrease the velocity of air or other gas which is under pressure and carries powder into the passage. Clearly, they are also sacrificial and soon wear away in use.

As noted, a major advantage of seal assemblies constructed according to the present invention is that they are able to tolerate substantial misalignment between the components of the equipment in which they are installed. This is true where the misalignment arises from the rotational axis of the shaft (and hence of the rotor) being off set from or at an angle to the ads of the stator. This can occur due to vibration of the shaft, wear in the bearings, thermal expansion, incorrect initial positioning of the shaft when it is installed, or a bent shaft. Misalignment can also arise where any of the radially extending interfacing surfaces are not flat or the axially extending interfacing surfaces are not round. This can occur due to incorrect manufacture or assembly of the equipment or the accumulation of variations in manufacting tolerances due to equipment size. Yet another cause of misalignment in screw conveyors is bowing or deflection of the shaft caused by the forces which act on the helical flights of all such conveyors arising from the material being handled. The possibility that any such misalignment will occur increases considerably with increasing size of the equipment. In seal assemblies constructed according to the present invention, there can be very considerable initial clearances between the interfacing surfaces of the rotor and the stator and the annular passages are correspondingly large. Of the examples shown in the drawings, this is perhaps most clear in FIGS. 4 to 8. The applicant considers that the assembly shown in FIG. 1 is suitable for medium duty, the assemblies shown in FIGS. 7 and 8 are suitable for heavy duty and the assembly shown in FIGS. 4 and 6 are suitable for extra heavy duty. The applicant has produced seal assemblies similar to those shown in FIGS. 4 and 6 having a radial clearance of as much as 12 mm at the axially extending (cylindrical) interfaces. (Where the fins are thin, these interfaces would be constituted by the tips of the fins). The applicant has also produced assemblies similar to those shown in FIGS. 7 and 8 having an axial clearance of as much 4 mm at the radially extending interfaces. It is not unusual to find misalignment of this scale in larger types of the applicable equipment envisaged herein for which the seal assemblies of the present invention are particularly well suited.

The provision of slipper plates and setting plates of the type shown in FIGS. 6, 7 and 8 are particularly useful in larger types of applicable equipment. They are of great advantage in helping to ensure that the components of the seal are initially in their correct positions relative to one another while at the same time reducing the initial flow of the working fluid into the passage until the layers of solid material build up in the passage. It is believed that elements of this kind having the characteristics as claimed herein are novel in themselves and could be used in conventional labyrinth seals.

Important dimensions of the seal assemblies shown in FIGS. 1 to 8 and of the components of which each of the seals are constructed, appear in the accompanying Table 1 which should also be read in conjunction with the seal assembly 300 shown FIG. 9 and the discussion which follows. For the purposes of this discussion, the seal assembly 300 is considered as 'ideal' so that the tolerances of the dimensions discussed are zero.

The seal assembly 300 includes a rotor R and a stator S. The rotor is mounted on, say, a shaft 302 of diameter D1 projecting through an aperture in, say, the wall 304 of a vessel in which a fluid is present. The rotor comprises two fins F1, F2 projecting radially outwardly from the outer face 306 of a cylindrical hub B1 of outside diameter D4. The outside diameter of each fin F1, F2 is D2. The stator S also comprises two fins F3. F4 projecting radially inwardly from the inner face 308 of a cylindrical body B2 of inside diameter D5. A portion of the fin F2 is located between the fins F3, F4 and a portion of the fin F3 is located between the fins F1, F2.

There is no contact between the rotor and the stator at any place. An annular passage thus exists between the rotor and the stator and, in the absence of any means to prevent it, the fluid in the vessel would be able to flow through the passage. For practical purposes, the length of the annular passage may be considered to be equal to the length of the line L which extends along the centre line of the passage.

The radial width W1 of each fin F1, F2 is equal to ½(D2−D4) and the radial width W2 of each fin F3, F4 is equal to ½(D5−D3). Each fin has a radially extending interfacing surface (in the sense in which this term is used in the claims) of width equal to (D2−D3) forming an interface with an adjacent flange. Furthermore, each fin F3, F4 has an axially extending interfacing surface 312 forming an interface with the outer face 306 of the rotor, and similarly each fin F1, F2 has an axially extending interfacing surface forming an interface with the inner face 308 of the stator. The widths of the respective axially extending interfacing surfaces are equal to the thicknesses T1, T2 of the fins.

The clearances between the faces of the components defining the passage (which may in practice all have different values so that the width of the passage may vary) are exaggerated in the drawing. As drawn the clearances are quite significant so that, in the present example, they also contribute to the length L of the passage. However, as may be deduced from a comparison of FIG. 9 with the other Figures, in practice, at least some of the clearances make a relatively small (and often insignificant) contribution to the length of the passage. In most practical seals at least some of the interfaces are significantly greater than the clearances between the fins and the faces 306, 308 so that the radial interfaces make the greatest contribution to the length L of the passage. In other practical seals the widths W1, W2 are significantly smaller and the radial interfaces make less contribution to the length L of the passage than the axial interfaces.

In the example shown in FIG. 9, the "minimum diameter of the annular passage", in the sense that this term is used in the claims, is equal to D4. Also, in FIG. 9 the "widest of the interfacing surfaces" are the axial faces 312 of the fins F3, F4. However, the values of W1 and W2 will often in practice be significantly greater than shown in FIG. 9. If (D2–D3) is greater than T2, then the "widest of the interfacing surfaces" would be those which extend radially.

In some instances, one or other of the components which initially define a passage between of the rotor or stator may not be round. In this case the passage as a whole will not initially be strictly annular. It is evident however that a part of the passage which is swept out by the rotor when it is rotating which must be annular. It is thus not essential that the components of the rotor and the stator which define the passage be annular, although manufacturing considerations will usually dictate that they are.

What is claimed is:

1. Apparatus for providing a seal between first and second relatively rotatable parts of a mechanism used in an environment comprising pulverulent material entrained in a fluid, the apparatus comprising:

a first element and a second element between which an annular passage is defined when the first element is mounted on one said part of the mechanism and the second element is mounted on the other said part of the mechanism and the one part is rotated with respect to the other, wherein the annular passage is defined by interfacing surfaces of the respective elements between which there is an initial clearance of substantially greater size than that of pulverulent material entrained in the fluid and is such as to enable said pulverulent material to enter the annular passage when the apparatus is in use and to be deposited in layers which build up so that there is formed between the layers a labyrinthine passage having a width which is substantially smaller than the size of said pulverulent material so that the flow of fluid through the labyrinthine passage is substantially restricted and substantially no further said pulverulent material can flow through the annular passage, the ratio of the minimum value of the initial clearance between the interfacing surfaces to the minimum diameter of the annular passage being not substantially less than 1:150.

2. Apparatus according to claim 1, wherein one of the elements is provided with an annular projection which in use projects into an annular recess formed in the other element, the annular projection embodying at least part of a first of the interfacing surfaces and the annular recess embodying at least part of a second of the interfacing surfaces.

3. Apparatus according to claim 1, wherein the ratio of the length of the annular passage to the minimum diameter of the annular passage is not substantially less than 1:2.

4. Apparatus according to claim 1, wherein the ratio of the width of the widest of the interfacing surfaces to the minimum diameter of the annular passage is not substantially less than 1:20.

TABLE A

All dimensions are in millimeters

|  |  | FIG. 9 | FIG. 1 | FIG. 4 | FIG. 5 | FIG. 6 | FIG. 7 |
|---|---|---|---|---|---|---|---|
| Diameter of shaft | D1 | 50 | 125 | 180 | 75 | 50 |
| Width of radial faces of rotor fins | W1 | 14.20 | 21.00 | 11.50 | 12.0 | 10.0 |
| Width of radial faces of stator fins | W2 | 14.20 | 20.50 | 11.50 | 12.5 | 13.0 |
| Thickness of rotor fins | T1 | 2.3 | 8.0 | 6.5 | 5.0 | 4.0 |
| Thickness of stator fins | T2 | 2.3 | 12 | 6.5 | 5.0 | 4.0 |
| Outside diameter of rotor fins | D2 | 84.9 | 178 | 219 | 109 | 82 |
| Inside diameter of stator fins | D3 | 57.5 | 143 | 199 | 90 | 61 |
| Inside diameter of rotor fins; i.e. least diameter of passage | D4 | 56.5 | 136 | 196 | 85 | 58 |
| Clearance between tips of stator fins and face of rotor passage | $\frac{D3 - D4}{2}$ | 0.5 | 3.5 | 1.5 | 2.5 | 1.5 |
| Outside diameter of stator fins; i.e. greatest diameter of passage | D5 | 85.9 | 184 | 222 | 115 | 87 |
| Clearance between adjacent radial faces of fins in passage | C1 | 0.40 | 5.0 | 2.0 | 1.0 | 0.5 |
| Overall length of passage | L | 71.4 | 253.5 | 108.5 | 127 | 82 |
| Rotational speed of shaft |  |  | 10–1400 | 125 | 10–1450 | 5–750 | 10–1000 |
| Range of D1 |  |  | 25–150 | 25–600 | 25–500 | 25+ | 25+ |
| Ratio of width of interfacing faces of fins {W1 – (D3 – D4)2} to least diameter of passage (D4) | R1 | 0.24 | 0.13 | 0.05 | 0.11 | 0.15 |
| Ratio of passage length (L) to least diameter of passage (D4) | R2 | 1.26 | 1.86 | 0.54 | 1.49 | 1.41 |
| Ratio of minimum clearance between faces of passage and least diameter of passage | R3 | 1:141 | 1:38.8 | 1:131 | 1:85 | 1:116 |

5. Apparatus according to claim 1, wherein the fluid is a gas.

6. Apparatus according to claim 1, wherein the fluid is a liquid.

7. Apparatus according to claim 1, in which a first member is provided which is located in the annular passage and which is constructed of material which is more susceptible to wear than the material of which the interfacing surfaces of the elements are constructed, there being clearance between the first member and the interfacing surfaces so that the first member is able to move both radially and axially in the annular passage.

8. Apparatus for providing a seal between first and second relatively rotatable parts of a mechanism used in an environment comprising pulverulent material entrained in a fluid, the apparatus comprising:

a first element and a second element between which an annular passage is defined when the first element is mounted on one said part of the mechanism and the second element is mounted on the other said part of the mechanism and the one part is rotated with respect to the other, wherein the annular passage is defined by interfacing surfaces of the respective elements between which there is a clearance such as to enable pulverulent material entrained in the fluid to enter the annular passage when the apparatus is in use and to be deposited in layers which build up so that there is formed between the layers a labyrinthine passage having a width which is substantially smaller than the clearance between the interfacing surfaces and is such that the flow of fluid through the labyrinthine passage is substantially restricted, and wherein the minimum value of the clearance between the interfacing surfaces is not substantially less than 0.4 mm.

9. Apparatus for providing a seal between first and second relatively rotatable parts of a mechanism used in an environment comprising pulverulent material entrained in a fluid, the apparatus comprising:

a first element and a second element between which an annular passage is defined when the first element is mounted on one said part of the mechanism and the second element is mounted on the other said part of the mechanism and the one part is rotated with respect to the other, wherein the annular passage is defined by interfacing surfaces of the respective elements between which there is a clearance such as to enable pulverulent material entrained in the fluid to enter the annular passage when the apparatus is in use and to be deposited in layers which build up so that there is formed between the layers a labyrinthine passage having a width which is substantially smaller than the clearance between the interfacing surfaces and is such that the flow of fluid through the labyrinthine passage is substantially restricted, and wherein the first element is a rotor and the second element is a stator and further comprising second and third members provided in the annular passage that are constructed of material which is more susceptible to wear than the material of which the interfacing surfaces of the elements are constructed, the second member being seated on the stator and the third member being seated on the rotor so as to rotate therewith with respect to the second member, there being clearance between the second member and the third member so that the third member is able to move radially with respect to the second member when the rotor rotates.

10. Apparatus for providing a seal between first and second relatively rotatable parts of a mechanism used in an environment comprising pulverulent material entrained in a fluid, the apparatus comprising:

a first element and a second element between which an annular passage is defined when the first element is mounted on one said part of the mechanism and the second element is mounted on the other said part of the mechanism and the one part is rotated with respect to the other, wherein the annular passage is defined by interfacing surfaces of the respective elements between which there is clearance and on which, when the mechanism is in use, the pulverulent material entrained in the fluid which enters the annular passage can be deposited in layers which substantially restrict flow of the fluid through the annular passage, and wherein a first member is provided which is located in the annular passage and which is constructed of material which is more susceptible to wear than the material of which the interfacing surfaces of the elements are constructed, there being clearance between the first member and the interfacing surfaces so that the first member is able to move both radially and axially in the annular passage.

* * * * *